US012776535B2

(12) United States Patent
Kato

(10) Patent No.: US 12,776,535 B2
(45) Date of Patent: Oct. 27, 2026

(54) ELECTROCHEMICAL CELL AND ELECTROCHEMICAL CELL MODULE

(71) Applicant: KYOCERA CORPORATION, Kyoto (JP)

(72) Inventor: Wataru Kato, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 693 days.

(21) Appl. No.: 17/757,146

(22) PCT Filed: Dec. 2, 2020

(86) PCT No.: PCT/JP2020/044933

§ 371 (c)(1),
(2) Date: Jun. 10, 2022

(87) PCT Pub. No.: WO2021/117584

PCT Pub. Date: Jun. 17, 2021

(65) Prior Publication Data

US 2023/0060060 A1 Feb. 23, 2023

(30) Foreign Application Priority Data

Dec. 13, 2019 (JP) ................................ 2019-225719

(51) Int. Cl.
*H01M 50/124* (2021.01)
*H01M 50/103* (2021.01)
*H01M 50/186* (2021.01)

(52) U.S. Cl.
CPC ....... *H01M 50/124* (2021.01); *H01M 50/103* (2021.01); *H01M 50/186* (2021.01)

(58) Field of Classification Search
CPC .......... H01M 10/052; H01M 10/0585; H01M 10/425; H01M 50/103; H01M 50/124; H01M 50/186
See application file for complete search history.

(56) References Cited

U.S. PATENT DOCUMENTS

2018/0277904 A1* 9/2018 Sasakawa et al. .... H01M 10/42
2019/0267584 A1* 8/2019 Kwon et al. ............ H01M 2/10

FOREIGN PATENT DOCUMENTS

| | | | | |
|---|---|---|---|---|
| JP | 2010086803 A | | 4/2010 | |
| JP | 2012174590 A | | 9/2012 | |
| JP | 2013048042 A | * | 3/2013 | ............. H01M 2/02 |
| JP | 5287104 B2 | | 9/2013 | |
| JP | 201996412 A | * | 6/2019 | ............. H01M 2/10 |

OTHER PUBLICATIONS

"Shangsuo, JP201996412A machine translation, 2019" (Year: 2019).*
Ueda, JP-2013048042-A EPO machine translation, 2013 (Year: 2013).*

* cited by examiner

*Primary Examiner* — Haroon S. Sheikh
*Assistant Examiner* — Kan Luo
(74) *Attorney, Agent, or Firm* — HAUPTMAN HAM, LLP

(57) ABSTRACT

A structure includes an electricity generator that charges and discharges through an electrochemical reaction, an inner case accommodating the electricity generator, and an outer case including a first sheet and a second sheet. The outer case accommodates the inner case between the first sheet and the second sheet. The first sheet and the second sheet are bonded to each other at peripheries of the first sheet and the second sheet. The inner case is bonded to the outer case.

19 Claims, 8 Drawing Sheets

ELECTROCHEMICAL CELL AND ELECTROCHEMICAL CELL MODULE

RELATED APPLICATIONS

The present application is a National Phase of International Application Number PCT/JP2020/044933, filed Dec. 2, 2020, which claims priority to Japanese Application No. 2019-225719, filed Dec. 13, 2019.

FIELD

The present disclosure relates to an electrochemical cell and an electrochemical cell module.

BACKGROUND

A known technique is described in, for example, Patent Literature 1.

CITATION LIST

Patent Literature

Patent Literature 1: Japanese Patent No. 5287104

BRIEF SUMMARY

An electrochemical cell according to an aspect of the present disclosure includes an electricity generator that charges and discharges through an electrochemical reaction, an inner case accommodating the electricity generator, and an outer case including a first sheet and a second sheet. The outer case accommodates the inner case between the first sheet and the second sheet. The first sheet and the second sheet are bonded to each other at peripheries of the first sheet and the second sheet. The inner case is bonded to the outer case.

An electrochemical cell module according to another aspect of the present disclosure includes a plurality of the above electrochemical cells, a current collector electrically connecting the plurality of electrochemical cells to one another, and a housing accommodating the plurality of electrochemical cells.

BRIEF DESCRIPTION OF DRAWINGS

The objects, features, and advantages of the present disclosure will become more apparent from the following detailed description and the drawings.

DETAILED DESCRIPTION

In the structure that forms the basis of the structure of an electrochemical cell according to one or more embodiments of the present disclosure and an electrochemical cell module including the electrochemical cells, as described in Patent Literature 1 for example, an enclosure to seal and accommodate an electrochemical cell body has a dual structure including an inner case and an outer case. The inner case and the outer case each include a stack including a thermally adhesive resin layer as an innermost layer.

With their innermost layers overlapping each other, the stacks in the inner case are heat-sealed at the peripheries. The inner case thus seals the electrochemical cell body inside. With their innermost layers overlapping each other, the stacks in the outer case are heat-sealed at the peripheries. The outer case thus seals, inside, the inner case that seals the electrochemical cell body inside. The inner case and the outer case include metal terminals of a positive electrode and a negative electrode protruding outside. The outer case has connections of the electrochemical cell outside.

In the structure that forms the basis of the electrochemical cell according to one or more embodiments of the present disclosure described in Patent Literature 1 above, the inner case and the outer case are not bonded to each other. The electrochemical cells and an electrochemical cell module, which is an assembly of the electrochemical cells, may vibrate due to movement during manufacture or transportation after shipment, thus causing misalignment of a unit cell stack in the electrochemical cell accommodated in the inner case in the outer case. An electrochemical cell and an electrochemical cell module without such misalignment of a stack are thus awaited.

An electrochemical cell according to one or more embodiments of the present disclosure and an electrochemical cell module including the electrochemical cells will now be described with reference to the drawings.

Figure 1:
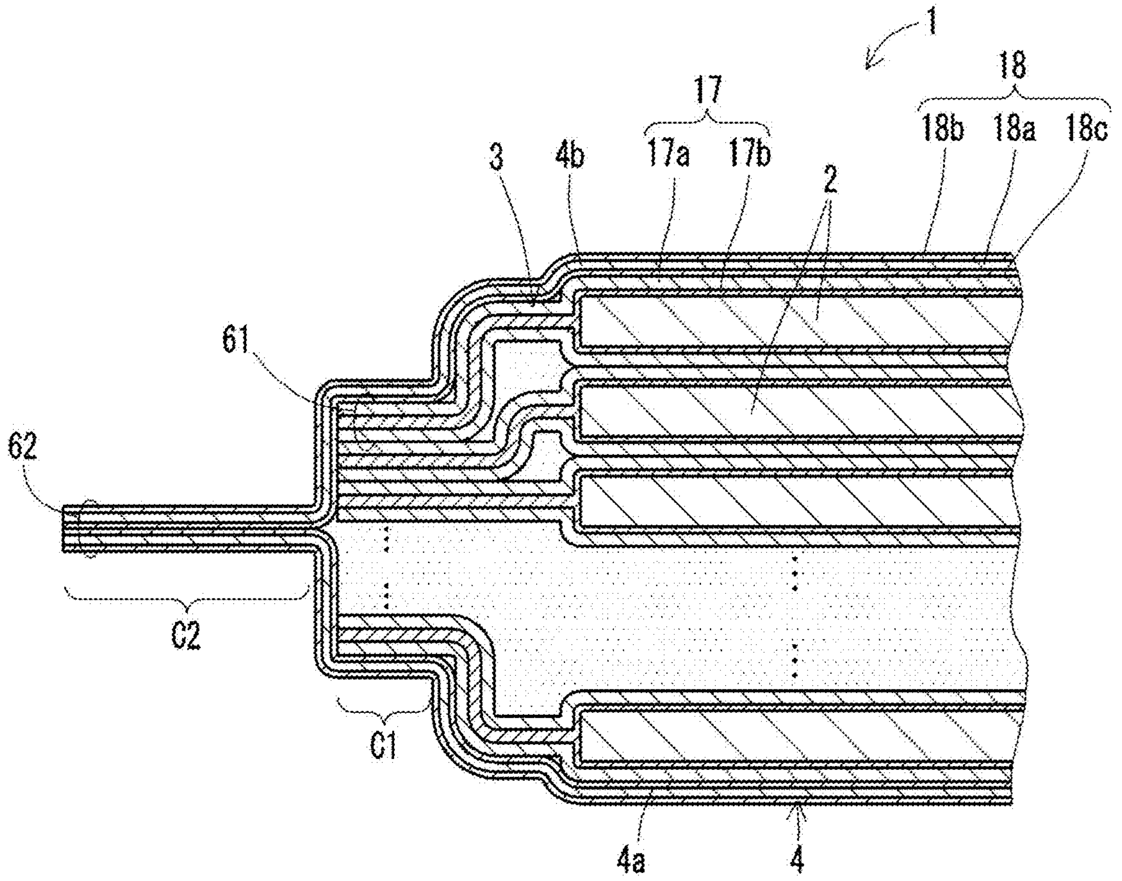
FIG. 1 is a schematic partially enlarged cross-sectional view of an example electrochemical cell according to an embodiment of the present disclosure taken along line A-A in FIG. 2.
Figure 2:
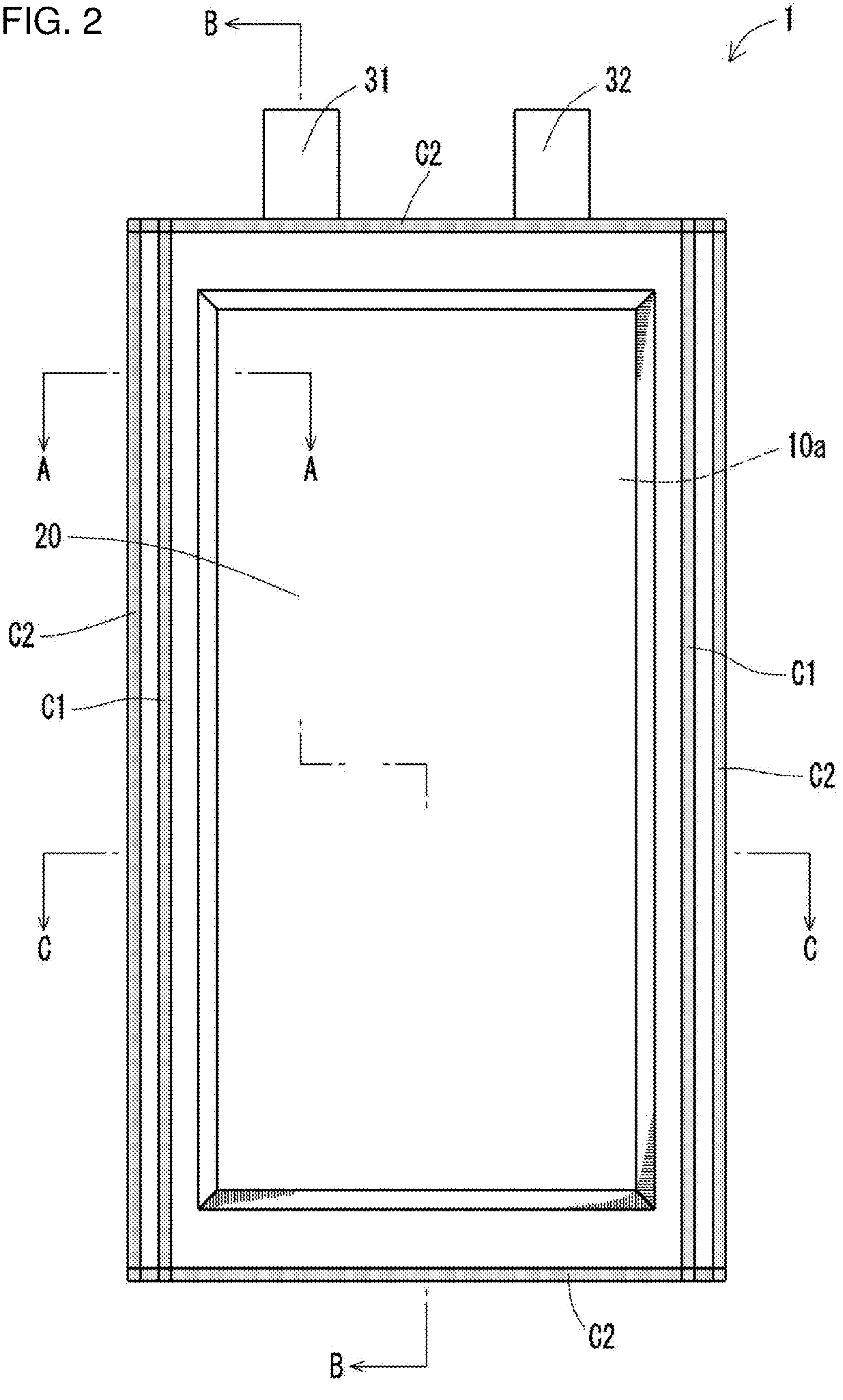
FIG. 2 is a front view of the electrochemical cell showing its overall appearance.
Figure 3:
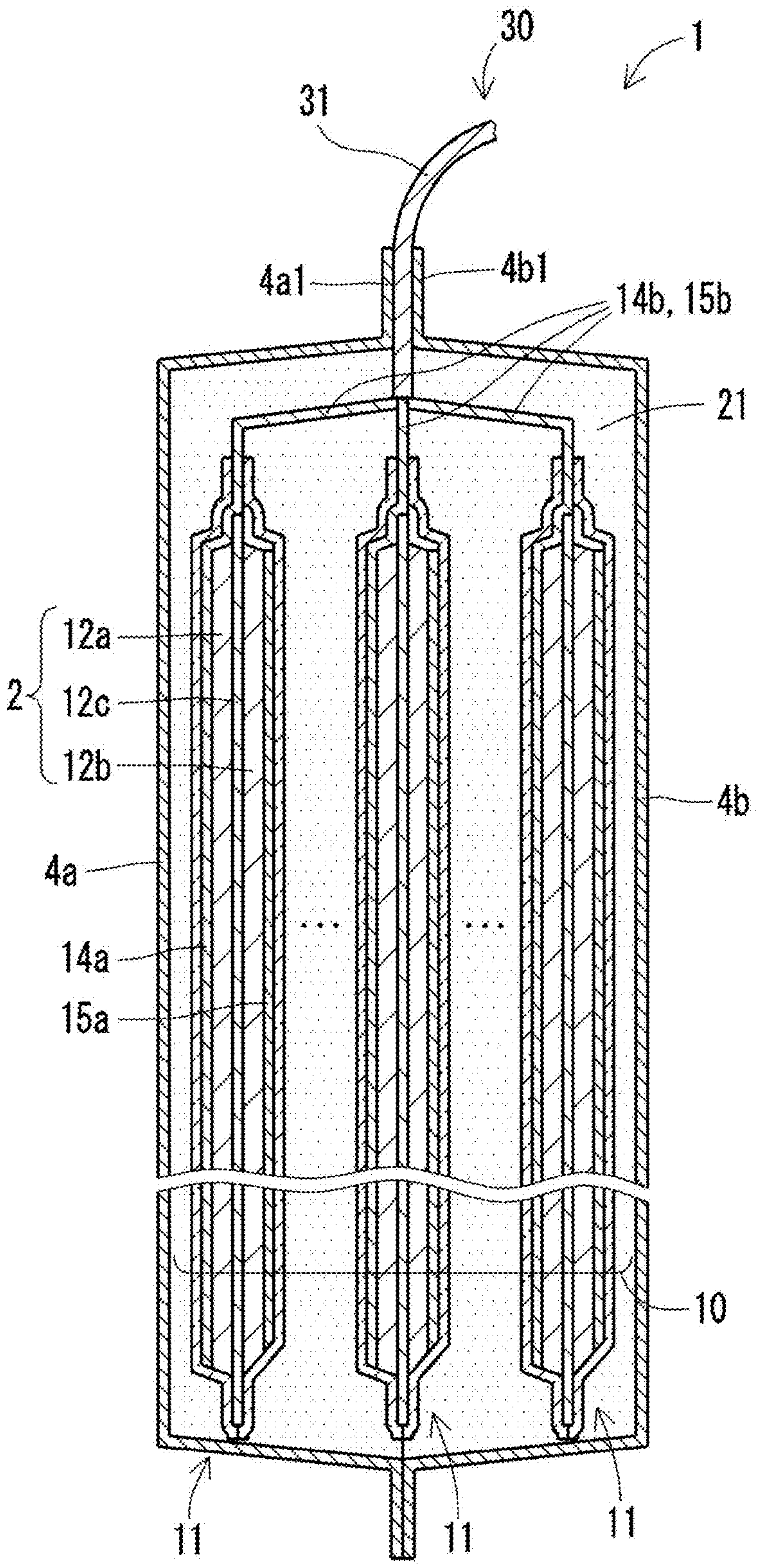
FIG. 3 is a cross-sectional view of the electrochemical cell taken along line B-B in FIG. 2.
Figure 4:
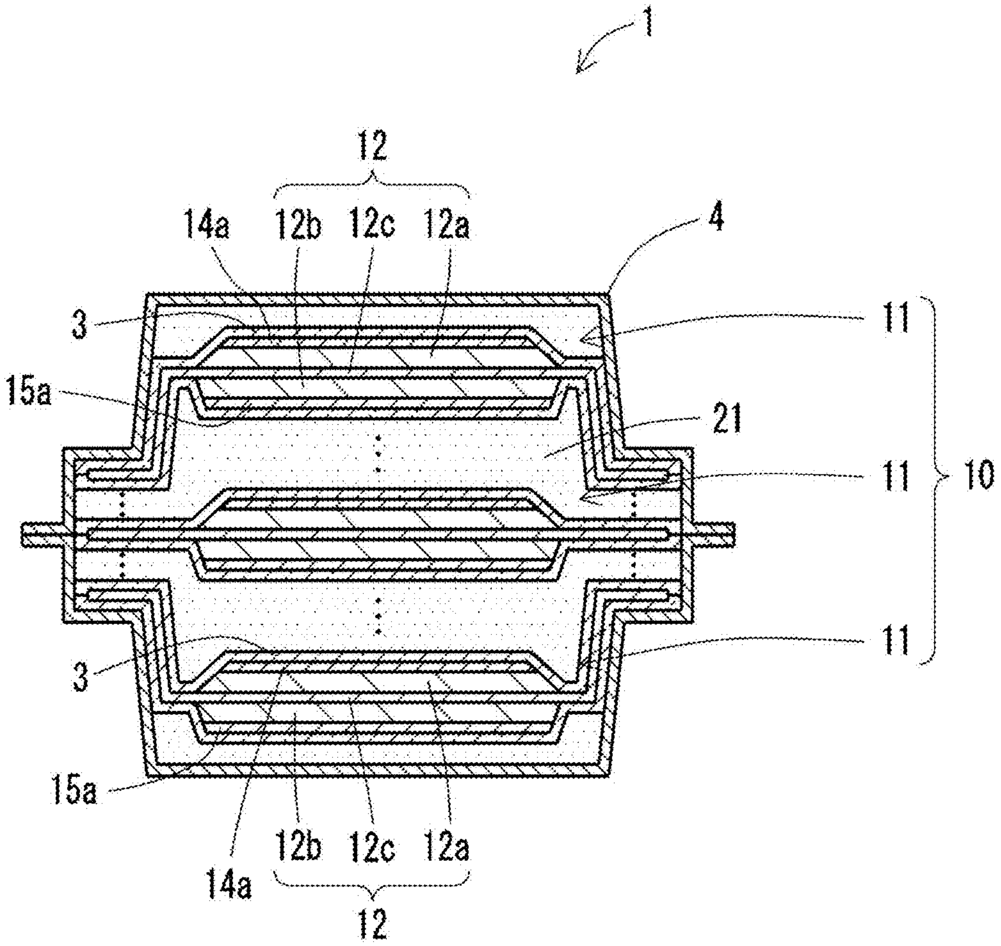
FIG. 4 is a cross-sectional view of the electrochemical cell taken along line C-C in FIG. 2.
Figure 5:
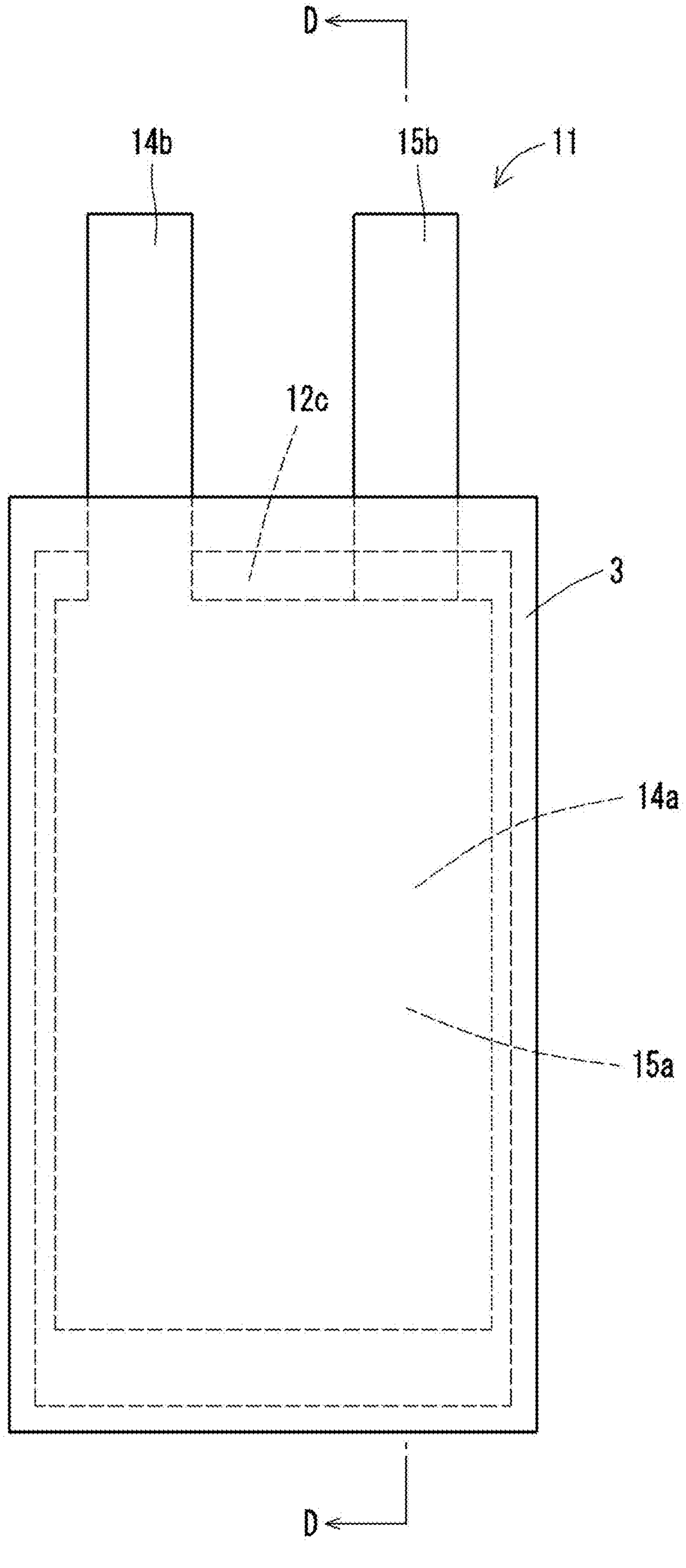
FIG. 5 is a front view of a unit cell in the electrochemical cell in FIG. 2.
Figure 6:
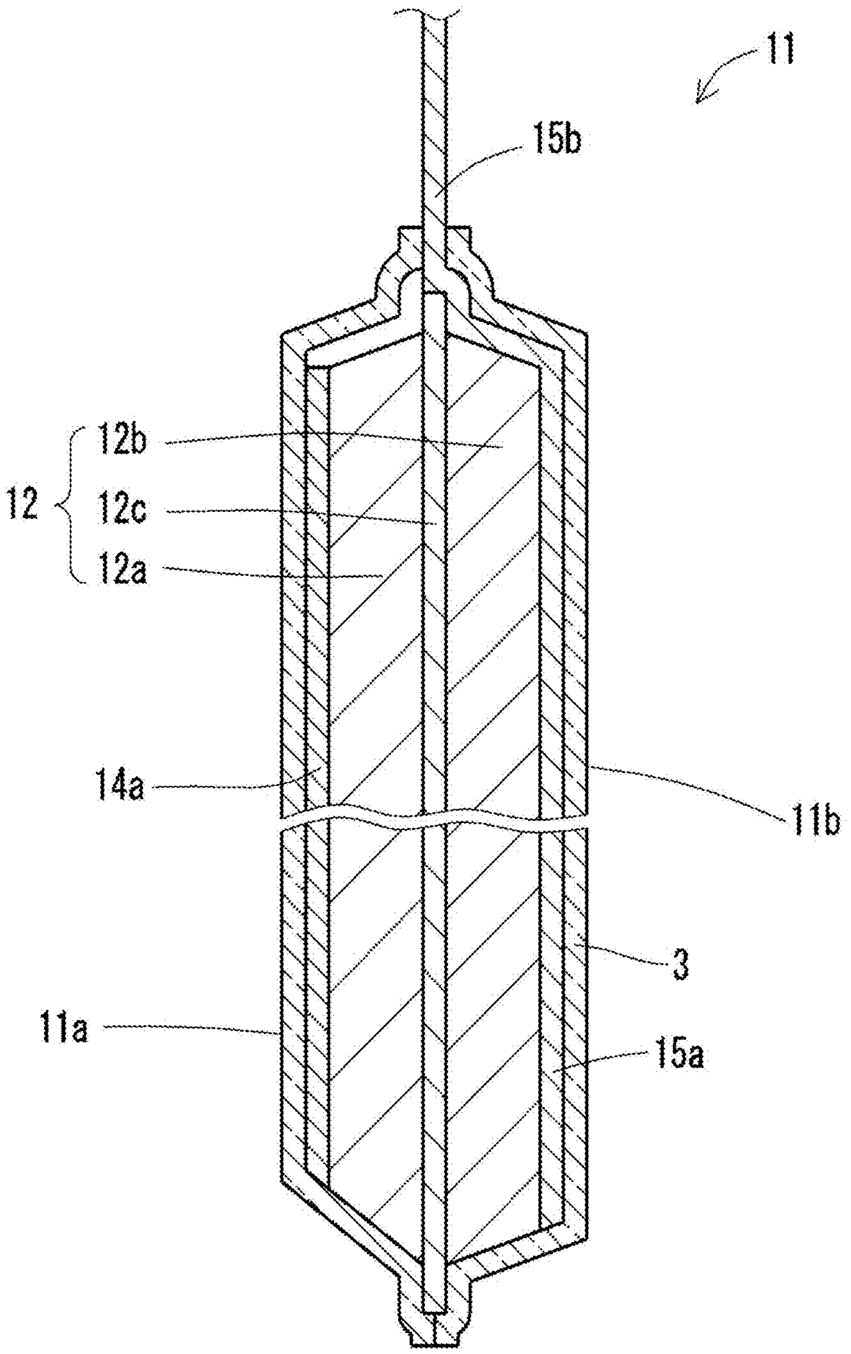
FIG. 6 is a cross-sectional view of the unit cell taken along line D-D in FIG. 5.

FIG. 1 is a schematic partially enlarged cross-sectional view of an example electrochemical cell according to an embodiment of the present disclosure taken along line A-A in FIG. 2. FIG. 2 is a front view of the electrochemical cell showing its overall appearance. FIG. 3 is a cross-sectional view of the electrochemical cell taken along line B-B in FIG. 2. FIG. 4 is a cross-sectional view of the electrochemical cell taken along line C-C in FIG. 2. FIG. 5 is a front view of a unit cell included in the electrochemical cell in FIG. 2. FIG. 6 is a cross-sectional view of the unit cell taken along line D-D in FIG. 5.

An electrochemical cell 1 according to the present embodiment includes electricity generators 2 that charge and discharge through an electrochemical reaction, inner cases 3 each accommodating the electricity generator 2, and an outer case 4 including a first sheet **4*a* and a second sheet 4*b* and accommodating the inner cases 3 between the first sheet 4*a* and the second sheet 4*b* that are bonded by heat sealing at a periphery 4*a*1 of the first sheet 4*a* and a periphery 4*b*1 of the second sheet 4*b*. The inner cases 3 are bonded to the outer case 4**.

The inner cases 3 and the outer case 4 each include a multilayer film with a thermally adhesive resin layer as an innermost layer. The electricity generators 2, the inner cases 3, and the outer case 4 are rectangular plates. Each inner case 3 includes portions 61 extending outside the area surrounding the electricity generator 2 in the inner case 3, and the outer case 4 includes a portion 62 surrounding the portions 61 of the inner cases 3 extending outside. The portions 61 are bonded to the portion 62.

More specifically, each inner case 3 includes a multilayer film 17 including a base layer 17*a* and an adhesive layer 17*b*. The base layer 17*a* is, for example, a polyethylene terephthalate (PET) film. The adhesive layer 17*b* containing polyethylene (PE) is stacked on a surface of the base layer 17*a* as an innermost thermally adhesive resin layer by, for example, coating. The outer case 4 includes a multilayer film 18 including a base layer 18*a*, an outer coating layer 18*b*, and an inner coating layer 18*c*. The base layer 18*a* includes a metal film of, for example, aluminum, an aluminum alloy, or stainless steel. The outer coating layer 18*b* containing a synthetic resin such as polyamide (nylon as a trade name) is stacked on one surface of the base layer 18*a*. The inner coating layer 18*c* containing a synthetic resin such as polypropylene (PP) is stacked on the other surface of the base layer 18*a*.

The inner case 3 includes two multilayer films 17 with their adhesive layers 17*b* inside and facing each other. The electricity generator 2 is located between the two multilayer films 17. The peripheries of the multilayer films 17 protruding outward from the electricity generator 2 are then heated and pressed by, for example, heat sealing. This bonds the adhesive layers 17*b* in the multilayer films 17 together, forming the unit cell 11 including the airtightly sealed electricity generator 2. The unit cell stack 10 includes the multiple unit cells 11 aligned in the same direction and stacked on one another.

The outer case 4 includes two multilayer films 18 with their inner coating layers 18*c* inside and facing each other. The unit cell stack 10 is located between the two multilayer films 18. Each multilayer film 18 has side edges extending along two parallel peripheral sides protruding outward from the unit cell stack 10. The unit cells 11 have their side edges between the side edges of the multilayer films 18, thus forming stacked portions. The stacked portions each include a bonding portion C1 that has been held between and fixed by a heat sealing machine. More specifically, the stacked portion is fixed with the inner coating layers 18*c* in the outer case 4 bonded by heat sealing to the base layers 17*a* in the inner cases 3 located outermost. The remaining side edges of the multilayer films 18 extending along the two facing parallel sides form a bonding portion C2. The bonding portion C2 does not include the side edges of the unit cells 11. The bonding portion C2 airtightly seal the outer case 4 with the inner coating layers 18*c* in the multilayer films 18 bonded to each other by heat sealing.

The outer case 4 with the above structure has a degassing hole with a diameter of about 1 mm near an area heat-sealed for discharging, for example, reaction gases generated from the internal electrochemical reactions and thermally expanded air.

Each bonding portion C1 bonding the outer case 4 and the inner cases 3 has a lower bonding strength P1 than a bonding strength P2 of the bonding portion C2 bonding the first sheet 4*a* and the second sheet 4*b* in the outer case 4 (P1<P2). When a gas is generated in the outer case 4, the bonding portion C1 bonding the outer case 4 and the inner cases 3 thus separates earlier than the bonding portion C2 bonding the first sheet 4*a* and the second sheet 4*b*. The separate bonding portion C1 adds, to the outer case 4, the capacity corresponding to the area in which the side edges of the unit cells 11 are bonded to one another in the bonding portion C1. Thus, the bonding portion C2 is less likely to separate with the gas. The unit cell stack 10 thus remains sealed in the outer case 4, reducing possible defects such as ejection of the unit cells 11 and leak of an electrolyte.

The bonding strength P1 and the bonding strength P2 may be measured in accordance with, for example, the test method JIS Z0238 (1998). The bonding strength P1 may be compared with the bonding strength P2 using the measured values.

The bonding portion C1 and the bonding portion C2 may be formed by the heat sealing machine, or using, for example, bonding members.

Each electricity generator 2 includes a positive electrode plate 12*a* including a positive electrode active material and a positive electrode current collector, a negative electrode plate 12*b* including a negative electrode active material and a negative electrode current collector, and a partition wall 12*c* as a separator between the positive electrode plate 12*a* and the negative electrode plate 12*b*. The electricity generator 2 includes connection terminals 30, that is, a connection terminal 31 connected to the positive electrode plate 12*a* and a connection terminal 32 connected to the negative electrode plate 12*b*. The connection terminals 31 and 32 are held between the inner case 3 and the outer case 4 with their distal ends protruding outward.

The electrochemical cell module includes multiple electrochemical cells 1 with the structure described above, a current collector 40 (described later with reference to FIG. 7) electrically connecting the electrochemical cells with one another, and a housing 50 (described later with reference to FIG. 7) accommodating the electrochemical cells 1.

An electrochemical cell 1 according to the present embodiment includes the unit cell stack 10 and the outer case 4. The unit cell stack 10 is a stack of multiple unit cells 11. The unit cell 11 is a plate. The unit cell 11 is the smallest unit member functioning as a battery in the electrochemical cell 1.

The unit cell 11 has a first main surface 11*a* and a second main surface 11*b* opposite to the first main surface 11*a*. The unit cell 11 may be, for example, rectangular, square, circular, oval, or in any other shape as viewed in the stacking direction (the lateral direction in FIG. 3) of the unit cell stack 10. The unit cell 11 in the present embodiment is, as shown in FIG. 5 for example, substantially rectangular as viewed in the stacking direction. The unit cell 11 has, for example, a long side of 50 to 500 mm and a short side of 50 to 300 mm as viewed in the stacking direction. The unit cell 11 has a thickness of, for example, 0.1 to 2 mm in the stacking direction.

The unit cell 11 includes the electricity generator 2, the inner case 3, a positive electrode terminal 14, and a negative electrode terminal 15. The electricity generator 2 charges and discharges through an electrochemical reaction. The electricity generator 2 includes, for example, the positive electrode plate 12*a*, the negative electrode plate 12*b*, and the partition wall 12*c* between the positive electrode plate 12*a* and the negative electrode plate 12*b*. The electricity generator 2 can exchange cations and anions between the positive electrode plate 12*a* and the negative electrode plate 12*b* through the partition wall 12*c*. The electricity generator 2 with the positive electrode plate 12*a* and the negative electrode plate 12*b* electrically connected to an external device can supply electricity to the external device.

The positive electrode plate 12*a* and the negative electrode plate 12*b* are, for example, electrochemically active. The positive electrode plate 12*a* and the negative electrode plate 12*b* may include, for example, an active material and an electrolyte. The electrolyte may be, for example, a solvent containing salt or a solvent mixture containing salt.

The positive electrode plate 12*a* may contain, for example, one selected from the group consisting of lithium nickel cobalt aluminum oxide (NCA), lithium manganese oxide spinel (LMO), lithium iron phosphate (LFP), lithium cobalt oxide (LCO), and lithium nickel cobalt manganese oxide (NCM). The positive electrode plate 12*a* may contain, for example, solid-state compounds used for, for example, nickel metal hydride batteries and nickel-cadmium batteries as known to those skilled in the art. The positive electrode plate 12*a* may contain, for example, one selected from $LiCoO_2$, magnesium (Mg)-doped $LiCoO_2$, and $LiNiO_2$.

The negative electrode plate 12*b* may contain, for example, one selected from carbon-based materials such as graphite, hard carbon, soft carbon, carbon nanotubes, and graphene. The negative electrode plate 12*b* may contain, for example, one selected from titanium oxide such as lithium titanate and titanium dioxide. The negative electrode plate 12*b* may contain, for example, one selected from a transition metal compound containing, for example, iron, cobalt, copper, manganese, or nickel.

When the electrochemical cell module is a lithium-ion battery, the electrolyte may be, for example, a solvent containing lithium salt. Examples of lithium salt contained in the electrolyte include $LiPF_6$, $LiBF_4$, LiFSI, and $LiClO_4$. Examples of the solvent contained in the electrolyte include propylene carbonate (PC), ethylene carbonate (EC), dimethyl carbonate (DMC), dimethoxyethane (DME), diethyl carbonate (DEC), tetrahydrofuran (THF), triethylene glycol dimethyl ether (triglyme), and γ-butyrolactone (GBL).

The partition wall 12*c* reduces the likelihood of a short circuit between the positive electrode plate 12*a* and the negative electrode plate 12*b*. For example, the partition wall 12*c* may have pores for passage of cations and anions. The partition wall 12*c* may be formed from, for example, a porous insulator. Examples of the porous insulator used for the partition wall 12*c* include polyolefin and polyvinyl chloride.

The electricity generator 2 may be, for example, rectangular, square, circular, oval, or in any other shape as viewed in the stacking direction. In the present embodiment, the electricity generator 2 is, for example, rectangular as viewed in the stacking direction. The electricity generator 2 has, for example, a long side of 50 to 500 mm and a short side of 50 to 300 mm as viewed in the stacking direction. The electricity generator 2 has a thickness of, for example, 0.1 to 2 mm in the stacking direction.

In the present embodiment, the multiple unit cells 11 are electrically connected to one another in parallel. This can increase the capacity of the electrochemical cell module. The multiple unit cells 11 may be electrically connected to one another in series. This can increase the voltage output across the electrochemical cell module.

The inner case 3 electrically insulates the electricity generator 2 from the external environment to protect the electricity generator 2 from the external environment. The inner case 3 entirely covers and accommodates the electricity generator 2. The inner case 3 is, for example, a flat bag. The inner case 3 may be formed by, for example, bonding two laminated films together. The inner case 3 is formed from, for example, a laminated film shaped into a flat bag. The inner case 3 may be, for example, rectangular, square, or in any other shape as viewed in the stacking direction. In the present embodiment, the inner case 3 is, as shown in FIG. 4 for example, rectangular as viewed in the stacking direction.

The inner case 3 includes, for example, an insulator. This can reduce the likelihood of a short circuit between the external environment and the electricity generator 2 through the inner case 3, protecting the electricity generator 2 from the external environment. The inner case 3 includes, for example, a resin material. The resin material may be, for example, PET or PE.

The inner case 3 may be, for example, multilayered. The inner case 3 includes, for example, a thermally adhesive resin material and a heat-resistant resin material. The thermally adhesive resin material melts, for example, at temperatures lower than 150° C. The thermally adhesive resin material may be, for example, PE or PP. The heat-resistant resin material melts, for example, at 150 to 300° C. inclusive. The heat-resistant resin material may be, for example, PET or polyethylene naphthalate.

The inner case 3 may include, for example, a stack of two laminated films facing each other and containing a thermally adhesive resin material and a heat-resistant resin material. The laminated films may be rectangular and have long sides and short sides. In forming the inner case 3, the two laminated films may be displaced from each other in the short-side direction and then bonded to each other. In other words, the two laminated films each may have an extension in which the two laminated films do not overlap each other as viewed in the stacking direction. The extensions may have a short side of, for example, 5 to 50 mm.

A thermally adhesive resin material portion in the extensions is bonded to a thermally adhesive resin material portion in the outer case 4 to improve the bonding strength between the inner case 3 and the outer case 4. Thus, the inner case 3 and the outer case 4 are less likely to be misaligned from each other. The electrochemical cell can thus have higher reliability.

The inner cases 3 may be bonded with one another with a thermally adhesive resin layer in the extension of each inner case 3 bonded to a heat-resistant resin layer in an extension of an adjacent inner case 3. This fixes the inner cases 3 with one another. Thus, the inner cases 3 are further less likely to be misaligned from one another in the outer case 4.

Through the positive electrode terminal 14 and the negative electrode terminal 15, electricity charged in the electricity generator 2 is output from the inner case 3. The positive electrode terminal 14 and the negative electrode terminal 15 extend from the inside to the outside of the inner case 3.

The positive electrode terminal 14 is electrically connected to the positive electrode plate 12*a*. The positive electrode terminal 14 is electrically insulated from the negative electrode plate 12*b* and the negative electrode terminal 15. The positive electrode terminal 14 is formed from, for example, a metal material. Examples of the metal material used for the positive electrode terminal 14 include aluminum and an aluminum alloy.

The positive electrode terminal 14 includes a first positive electrode terminal portion 14*a* inside the inner case 3, and a second positive electrode terminal portion 14*b* outside the inner case 3. The first positive electrode terminal portion 14*a* may be in contact with the positive electrode plate 12*a*. The first positive electrode terminal portion 14*a* may be located between the inner case 3 and the positive electrode plate 12*a*. The second positive electrode terminal portion 14*b* is connected to a connection terminal of the electrochemical cell 1. The second positive electrode terminal portion 14*b* may be, for example, a rectangular or square plate, or in any other shape. In the present embodiment, the second positive electrode terminal portion 14*b* is, as shown in FIG. 5 for example, rectangular as viewed in the stacking direction. The second positive electrode terminal portion 14*b* has, for example, a long side of 30 to 100 mm and a short side of 10 to 100 mm as viewed in the stacking direction. The second positive electrode terminal portion 14*b* has a thickness of, for example, 3 to 30 μm in the stacking direction.

The negative electrode terminal 15 is electrically connected to the negative electrode plate 12*b*. The negative electrode terminal 15 is electrically insulated from the positive electrode plate 12*a* and the positive electrode terminal 14. The negative electrode terminal 15 is formed from, for example, a metal material. Examples of the metal material used for the negative electrode terminal 15 include copper and a copper alloy.

The negative electrode terminal 15 includes a first negative electrode terminal portion 15*a* inside the inner case 3, and a second negative electrode terminal portion 15*b* outside the inner case 3. The first negative electrode terminal portion 15*a* may be in contact with the negative electrode plate 12*b*. The first negative electrode terminal portion 15*a* may be located between the inner case 3 and the negative electrode plate 12*b*. The second negative electrode terminal portion 15*b* is connected to the connection terminal of the electrochemical cell 1. The second negative electrode terminal portion 15*b* may be, for example, a rectangular or square plate, or in any other shape. In the present embodiment, the second negative electrode terminal portion 15*b* is, as shown in FIG. 5 for example, rectangular as viewed in the stacking direction. The second negative electrode terminal portion 15*b* has, for example, a long side of 30 to 100 mm and a short side of 10 to 100 mm as viewed in the stacking direction. The second negative electrode terminal portion 15*b* has a thickness of, for example, 3 to 30 μm in the stacking direction.

The second positive electrode terminal portion 14*b* and the second negative electrode terminal portion 15*b* may, as shown in FIG. 4 for example, extend outward from one side of the inner case 3 as viewed in the stacking direction. The second positive electrode terminal portion 14*b* and the second negative electrode terminal portion 15*b* may extend outward from different sides of the inner case 3 as viewed in the stacking direction.

The outer case 4 protects the unit cell stack 10 from the external environment. The external environment includes, for example, oxygen and moisture in the air. The outer case 4 entirely covers and accommodates the unit cell stack 10. The outer case 4 may be, for example, a cylinder, a bag, or in any other shape. The outer case 4 may be formed by, for example, bonding two members together into a bag. The outer case 4 may be formed from, for example, a single member shaped into a bag. The outer case 4 may be, for example, rectangular, square, or in any other shape as viewed in the stacking direction. In the present embodiment, the outer case 4 is, as shown in FIG. 1 for example, rectangular as viewed in the stacking direction. The outer case 4 has its long-side and short-side directions substantially corresponding to the long-side and short-side directions of the unit cell stack 10 as viewed in the stacking direction. The outer case 4 may have, for example, a long side of 50 to 600 mm and a short side of 50 to 400 mm as viewed in the stacking direction. The outer case 4 has its portion overlapping the unit cell stack 10 with a thickness of, for example, 50 to 300 μm as viewed in the stacking direction.

The electrochemical cell 1 includes a connection terminal 30. Through the connection terminal 30, the electricity charged in the unit cell stack 10 is output from the outer case 4. The connection terminal 30 includes a first connection terminal 31 and a second connection terminal 32. The first connection terminal 31 and the second connection terminal 32 extend from the inside to the outside of the outer case 4. The first connection terminal 31 has its portion located inside the outer case 4 and bonded to the multiple positive electrode terminals 14 connected to one another. The second connection terminal 32 has its portion located inside the outer case 4 and bonded to the multiple negative electrode terminals 15 connected to one another. The first connection terminal 31 and the second connection terminal 32 may include, for example, a metal material. Examples of the metal material for the first connection terminal 31 and the second connection terminal 32 include copper, a copper alloy, aluminum, and an aluminum alloy.

The outer case 4 includes, for example, an insulator. This can reduce the likelihood of a short circuit between the external environment and the unit cell stack 10 through the outer case 4, protecting the unit cell stack 10 from the external environment. The insulator may be, for example, a resin material such as PET and PE.

The outer case 4 may be, for example, multilayered. The outer case 4 may be, for example, three-layered. The outer case 4 may include, for example, a first insulating layer, a moisture-proof layer, and a second insulating layer. The moisture-proof layer is located between the first insulating layer and the second insulating layer. The moisture-proof layer may be covered with the first insulating layer and the second insulating layer. The moisture-proof layer may be in direct contact with the first insulating layer and the second insulating layer.

The first insulating layer may be the outermost layer of the three layers in the outer case 4. The first insulating layer may include a resin material such as PET and polyethylene naphthalate. The moisture-proof layer reduces oxygen or moisture penetrating the first insulating layer and reaching the second insulating layer. The moisture-proof layer may include a metal material, for example, copper, a copper alloy, aluminum, or an aluminum alloy. The second insulating layer may include a resin material such as PE and PP.

The outer case 4 may include a liquid layer 21 to transmit external pressure to the unit cells 11. The liquid layer 21 is located between two adjacent unit cells 11. The liquid layer 21 may be in direct contact with the two adjacent unit cells 11. Although the unit cells 11 each may have recesses on its first main surface 11*a* and its second main surface 11*b*, the liquid layer 21 may be located inside the recesses to allow pressure to be applied uniformly to the two adjacent unit cells 11. In other words, this structure allows the two adjacent unit cells 11 to perform charging and discharging reactions without varying interface resistances. The unit cells 11 are thus less likely to deteriorate. Each electrochemical cell 1 can thus have a longer service life.

The liquid layer 21 may be located, as shown in FIGS. 2 and 3 for example, between the unit cell stack 10 and the outer case 4. Such a unit cell stack 10 is thus less likely to be misaligned in the outer case 4. This reduces the likelihood of damage at the joint between the connection terminal 30 and the positive electrode terminals 14 or between the connection terminal 30 and the negative electrode terminals 15.

The liquid layer 21 may be, for example, an organic solvent. Examples of the organic solvent used for the liquid layer 21 include EC and GBL. The liquid layer 21 may also be formed from, for example, a flowable low-molecular-weight polymer material such as polyethylene oxide. The liquid layer 21 may also be formed from a silicon-based polymer material such as silicone.

The liquid layer 21 may contain, for example, a water-absorbent material such as a water-absorbent polymer. The liquid layer 21 can thus absorb moisture entering the outer case 4 and reduce entry of moisture into the unit cells 11. Each electrochemical cell 1 can thus have a longer service life. The water-absorbent polymer used for the liquid layer 21 may be, for example, polyacrylonitrile.

The liquid layer 21 may include, for example, an inorganic material such as a porous filler. The liquid layer 21 can thus absorb moisture entering the outer case 4 and reduce entry of moisture into the unit cells 11. Each electrochemical cell 1 can thus have a longer service life. The porous filler used for the liquid layer 21 may be, for example, zeolite.

The liquid layer 21 may include a metal filler reactable with oxygen and water. Oxygen and water entering the outer case 4 may react with the metal filler and thus are less likely to enter the unit cells 11. Each electrochemical cell 1 can thus have a longer service life. Examples of the metal filler used for the liquid layer 21 include iron, copper, a copper alloy, aluminum, and an aluminum alloy.

The liquid layer 21 may be formed from a material having higher thermal conductivity than an electrolyte used in the electricity generator 2. This facilitates transfer of heat generated in the unit cells 11 to the liquid layer 21. The unit cells 11 are thus less likely to accumulate heat. Each electrochemical cell 1 can thus have a longer service life.

The liquid layer 21 may be formed from a material having higher viscosity than the electrolyte used in the electricity generator 2. The unit cell stack 10 is thus less likely to be misaligned in the outer case 4. This reduces the likelihood of damage at the joint between the connection terminal 30 and the positive electrode terminals 14 or between the connection terminal 30 and the negative electrode terminals 15 without an additional adhesive or adhesive tape. Each electrochemical cell 1 can thus have a longer service life.

The electrochemical cell module according to one or more embodiments of the present disclosure will now be described.

Figure 7:
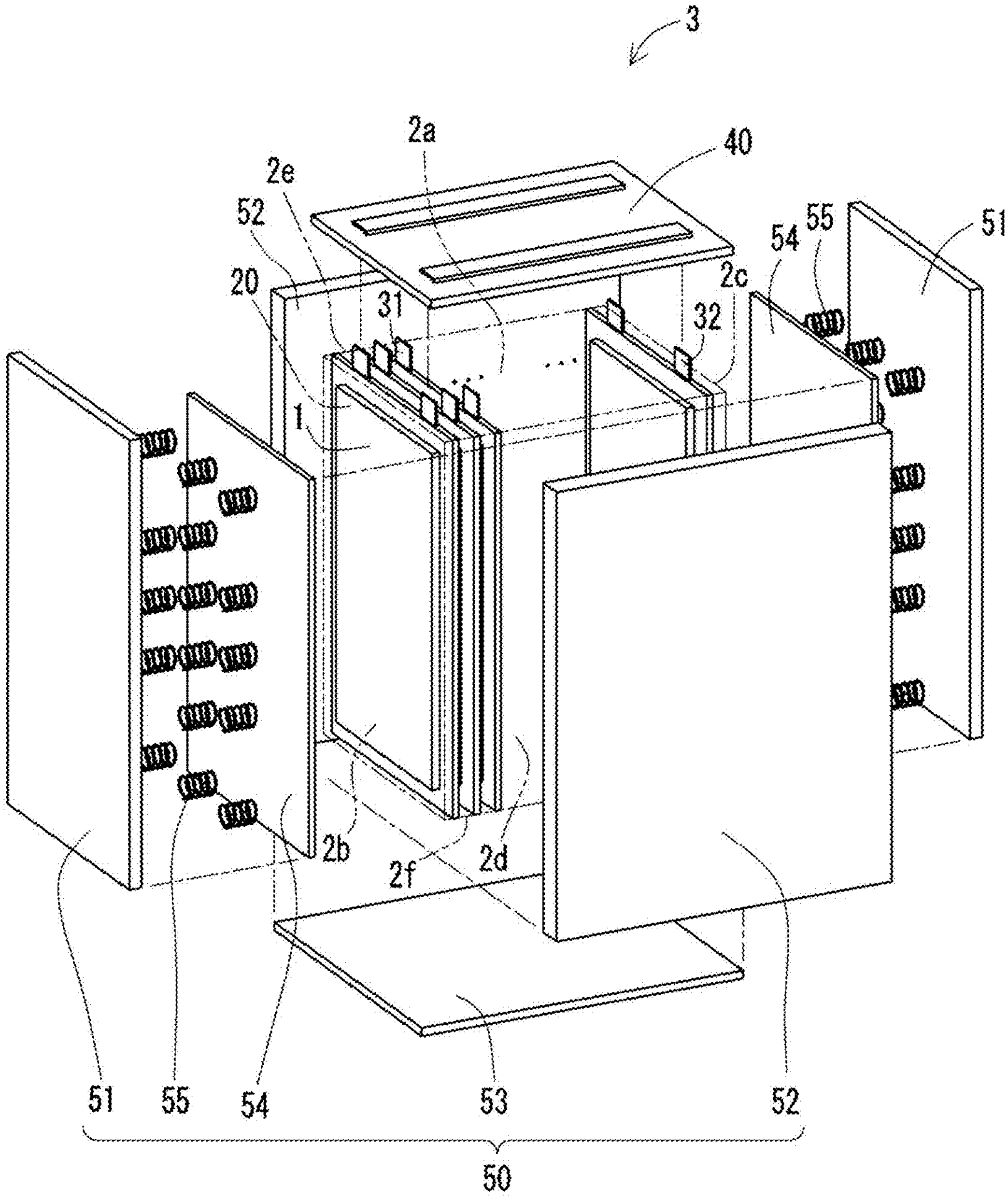
FIG. 7 is an exploded perspective view of an example electrochemical cell module according to an embodiment of the present disclosure.

FIG. 7 is an exploded perspective view of an example electrochemical cell module according to an embodiment of the present disclosure. The components corresponding to those in the above embodiments are given the same reference numerals and will not be described repeatedly. The electrochemical cell module according to the present embodiment includes the multiple electrochemical cells 1 described in the above embodiment, the current collector 40, and the housing 50.

The multiple electrochemical cells 1 are stacked on one another in a predetermined second direction. The multiple electrochemical cells 1 are stacked on one another with their profiles substantially in conformance with one another as viewed in the second direction, forming an electrochemical cell stack 20. The electrochemical cell stack 20 is, as shown in FIG. 7 for example, substantially rectangular. The multiple electrochemical cells 1 each include the first connection terminal 31 and the second connection terminal 32 protruding from an upper surface 2*a* of the electrochemical cell stack 20.

The current collector 40 electrically connects the multiple electrochemical cells 1 to one another. The current collector 40 may electrically connect the multiple electrochemical cells 1 in parallel. In other words, the current collector 40 may electrically connect the first connection terminals 31 of the multiple electrochemical cells 1 together, and the second connection terminals 32 of the multiple electrochemical cells 1 together. This can increase the capacity of the electrochemical cell module.

To electrically connect the multiple electrochemical cells 1 in series, the current collector 40 may electrically connect the first connection terminals 31 and the second connection terminals 32 of the multiple electrochemical cells 1 to form a series connection. This can increase the voltage across the electrochemical cell module.

The housing 50 accommodates the electrochemical cell stack 20 (multiple electrochemical cells 1) and protects the electrochemical cell stack 20 from the external environment. The housing 50 may protect the electrochemical cell stack 20 against an external force from the external environment. In the present embodiment, the housing 50 may be, as shown in FIG. 7 for example, a rectangular box open at one surface. The housing 50 may include, for example, a single part shaped into a rectangular prism open at one surface. The housing 50 may also include, for example, two or more parts combined together.

The housing 50 may include, for example, a metal material. Such a housing 50 has higher rigidity and reduces transmission of any external force from the external environment to the unit cell stack 10. The housing 50 thus protects the electrochemical cell stack 20 from the external environment. The metal material used for the housing 50 may be, for example, aluminum or stainless steel. This facilitates transfer of heat generated in the electrochemical cell stack 20 to the housing 50. The electrochemical cell stack 20 is thus less likely to accumulate heat. Each electrochemical cell 1 and the electrochemical cell module including the electrochemical cells 1 can thus have a longer service life.

The housing 50 may include, for example, multiple parts. The multiple parts may include, for example, two main surface plates 51, two side plates 52, and a bottom plate 53. The main surface plates 51, the side plates 52, and the bottom plate 53 may include a metal material and a resin material.

The two main surface plates 51 protect end faces 2*b* and 2*c* of the electrochemical cell stack 20 in the second direction. The two main surface plates 51 face the respective end faces 2*b* and 2*c* of the electrochemical cell stack 20. The main surface plates 51 may be rectangular as viewed in the second direction. In this case, the main surface plates 51 may have, for example, a long side of 200 to 600 mm and a short side of 50 to 300 mm. The main surface plates 51 may have, for example, a thickness of 0.5 to 5 mm.

The main surface plates 51 may be formed from, for example, a metal material. Examples of the metal material used for the main surface plates 51 include aluminum, an aluminum alloy, and stainless steel. This facilitates transfer of heat generated in the electrochemical cells 1 outside through the main surface plates 51. Each electrochemical cell 1 can thus have a longer service life.

The main surface plates 51 may be formed from, for example, a resin material. The resin material used for the main surface plates 51 may be, for example, a heat-resistant resin material such as PET. Such main surface plates 51 can electrically insulate the electrochemical cells 1 from the external environment, thus reducing the likelihood of a short circuit between the electrochemical cells 1 and the external environment. Each electrochemical cell 1 can thus have a longer service life.

The two side plates 52 protect side surfaces 2*d* and 2*e* each connected to the upper surface 2*a* of the electrochemical cell stack 20 and parallel to the second direction. The two side plates 52 face the respective side surfaces 2d and 2e of the electrochemical cell stack 20.

The side plates 52 may be in contact with at least one of the side surfaces 2d or 2e of the electrochemical cell stack 20. This facilitates transfer of heat generated in the electrochemical cells 1 outside through the side plates 52. Each electrochemical cell 1 can thus have a longer service life. Although at least one of the side plates 52 is in contact with either the side surface 2d or the side surface 2e of the electrochemical cell stack 20, the electrochemical cell module in the present embodiment including the electrochemical cells 1 in the above embodiment can reduce the likelihood of deformation of the outer case 4 and of misalignment of the unit cell stack 10 in the outer case 4. The electrochemical cells 1 can reduce the likelihood of lowering the durability.

The side plates 52 may be rectangular as viewed in a direction perpendicular to the side surfaces 2d and 2e of the electrochemical cell stack 20. In this case, the side plates 52 may have, for example, a long side of 200 to 600 mm and a short side of 50 to 300 mm. The side plates 52 may have, for example, a thickness of 0.5 to 5 mm.

The side plates 52 may be formed from, for example, a metal material. Examples of the metal material used for the side plates 52 include aluminum, an aluminum alloy, and stainless steel. This facilitates transfer of heat generated in the electrochemical cells 1 outside through the side plates 52. Each electrochemical cell 1 can thus have a longer service life.

The side plates 52 may be formed from, for example, a resin material. The resin material used for the side plates 52 may be, for example, a heat-resistant resin material such as PET. Such side plates 52 can electrically insulate the electrochemical cells 1 from the external environment, thus reducing the likelihood of a short circuit between the electrochemical cells 1 and the external environment. Each electrochemical cell 1 can thus have a longer service life.

The bottom plate 53 protects a lower surface 2f opposite to the upper surface 2a of the unit cell stack 10. The bottom plate 53 may be, for example, bent parts of the main surface plates 51 or the side plates 52.

The bottom plate 53 may be in contact with the lower surface 2f opposite to the upper surface 2a of the electrochemical cell stack 20. This facilitates transfer of heat generated in the electrochemical cells 1 outside through the bottom plate 53. Each electrochemical cell 1 can thus have a longer service life. Although the bottom plate 53 is in contact with the lower surface 2f of the electrochemical cell stack 20, the electrochemical cell module in the present embodiment including the electrochemical cells 1 in the above embodiment can reduce the likelihood of deformation of the outer case 4 and of misalignment of the unit cell stack 10 in the outer case 4. The electrochemical cells 1 can reduce the likelihood of lowering the durability.

The bottom plate 53 may be rectangular as viewed in a direction perpendicular to the lower surface 2f of the electrochemical cell stack 20. In this case, the bottom plate 53 may have, for example, a long side of 200 to 600 mm and a short side of 50 to 300 mm. The bottom plate 53 may have, for example, a thickness of 0.5 to 5 mm.

The bottom plate 53 may be formed from, for example, a metal material. Examples of the metal material used for the bottom plate 53 include aluminum, an aluminum alloy, and stainless steel. This facilitates transfer of heat generated in the electrochemical cells 1 outside through the bottom plate 53. Each electrochemical cell 1 can thus have a longer service life.

The bottom plate 53 may be formed from, for example, a resin material. The resin material used for the bottom plate 53 may be, for example, a heat-resistant resin material such as PET. Such a bottom plate 53 can electrically insulate the electrochemical cells 1 from the external environment, thus reducing the likelihood of a short circuit between the electrochemical cells 1 and the external environment. Each electrochemical cell 1 can thus have a longer service life.

The electrochemical cell stack 20 may be held with their end faces 2b and 2c in the second direction pressed in the housing 50. The electrochemical cell stack 20 may be pressed and held by pressure plates 54 and elastic members 55.

The pressure plates 54 may be formed from, for example, a metal material. This facilitates transfer of heat generated in the electrochemical cells 1 outside. Each electrochemical cell 1 can thus have a longer service life. Examples of the metal material used for the pressure plates 54 include aluminum, an aluminum alloy, and stainless steel.

The pressure plates 54 may also be formed from, for example, an insulating resin material. Such pressure plates 54 can electrically insulate the electrochemical cells 1 from the external environment, thus reducing the likelihood of a short circuit between the electrochemical cells 1 and the external environment. The resin material used for the pressure plates 54 may be, for example, a thermosetting resin such as an epoxy resin, a phenolic resin, or a melamine resin.

The pressure plates 54 may also be formed from, for example, both a resin material and a metal material. The resin material may be used for portions of the pressure plates 54 in contact with the electrochemical cell stack 20. Such portions can electrically insulate the electrochemical cells 1 from the pressure plates 54, thus reducing the likelihood of a short circuit between the electrochemical cells 1 and the external environment. The pressure plates 54 including a metal material are less likely to be damaged.

The elastic members 55 are located between the pressure plates 54 and the main surface plates 51 of the housing 50. The elastic members 55 apply pressure to the pressure plates 54 to apply pressure to the electrochemical cells 1. The elastic members 55 may be, for example, springs. The springs may be, for example, helical compressed coil springs. The springs may be, for example, leaf springs including bent plates. The springs may be formed from, for example, a metal material. Examples of the metal material used for the springs include spring steel and stainless steel each with a spring constant high enough to apply a counterforce corresponding to an inertial load of the electrochemical cell stack 20 generated by possible vibration or impact, and weather resistance to the surrounding environment. The helical springs may have, for example, a diameter of 5 to 50 mm, a length of 10 to 50 mm, and a pitch of 1 to 10 mm.

The elastic members 55 may be, for example, a rubber material shaped into plates. The rubber plates may have, for example, the same shape as the pressure plates 54. The rubber material may be, for example, natural rubber or synthetic rubber.

The unit cell stack 10 may have their end faces 2b and 2c in the second direction receiving pressure applied by the housing 50. The housing 50 may apply pressure to the end faces 2b and 2c of the electrochemical cell stack 20 with, for example, their main surface plates 51 fastened to the side plates 52 with screws to press the end faces 2b and 2c of the unit cell stack 10.

The electrochemical cell module including the electrochemical cells 1 can achieve an electrochemical cell module with higher durability. In addition, the electrochemical cell module including the housing 50 with higher rigidity may reduce transmission of any external force from the external environment to the electrochemical cells 1. Such an electrochemical cell module can have still higher durability.

Figure 8:
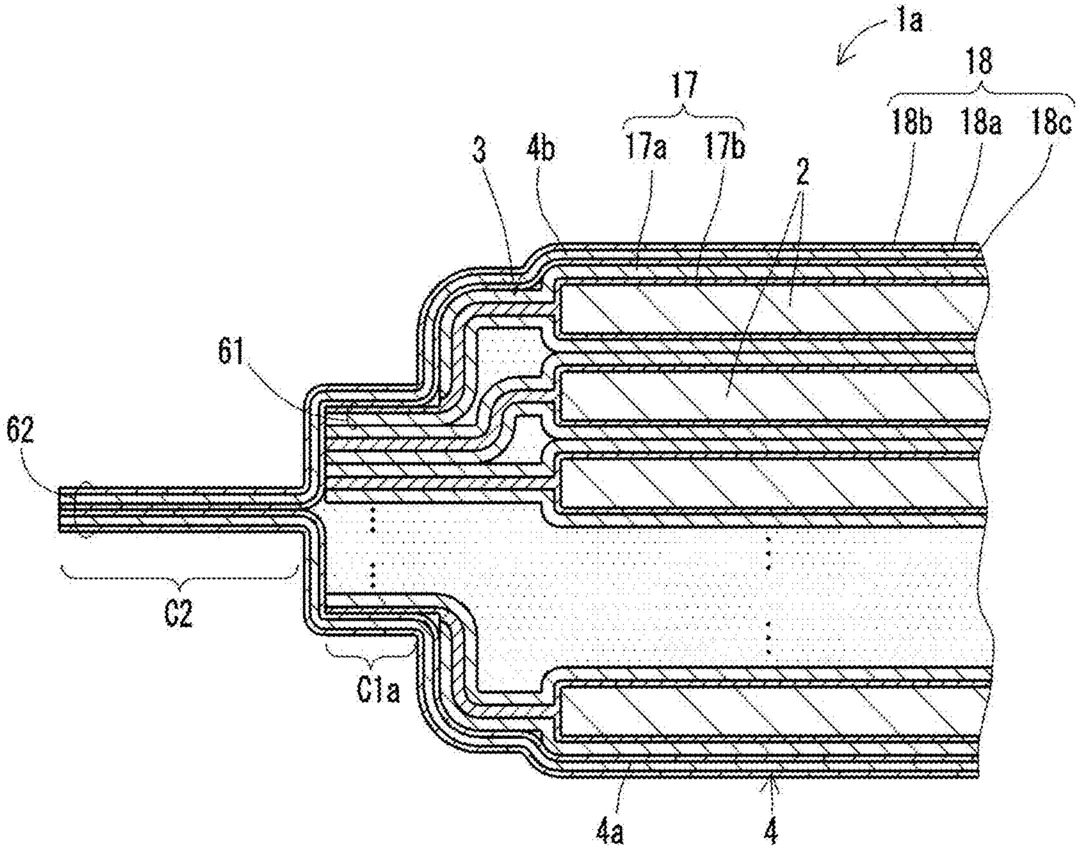
FIG. 8 is a schematic partially enlarged cross-sectional view of an electrochemical cell according to another embodiment of the present disclosure.

FIG. 8 is a schematic partially enlarged cross-sectional view of an electrochemical cell according to another embodiment of the present disclosure. The components corresponding to those in the above embodiment are given the same reference numerals and will not be described repeatedly. In an electrochemical cell 1*a* according to the present embodiment, unit cells 11 located outermost in the stacking direction of a unit cell stack 10 (located uppermost and lowermost in FIG. 1) each have a multilayer film 17 including an outer layer and an adhesive layer 17*b* of a thermally adhesive resin layer. A portion of the outer layer located in the stacked portion is removed to expose the adhesive layer 17*b* outward. The exposed adhesive layer 17*b* and the inner coating layer 18*c* of a thermally adhesive resin layer in the outer case 4 directly facing each other are ultrasonically bonded to each other, thus forming a bonding portion C1*a*.

In the bonding structure, the adhesive layers 17*b* in the multilayer films 17 forming the inner case 3 are bonded to the inner coating layers 18*c* in the multilayer films 18 included in the outer case 4. Thus, the outer case 4 can be bonded to the inner case 3 with a higher bonding strength.

An electrochemical cell system according to another embodiment of the present disclosure includes the electrochemical cell module in the above embodiments, and a controller to control the electrochemical cell module. The controller may be a control integrated circuit (IC) incorporated in the electrochemical cell module to protect a battery from overcharge and overdischarge. The control IC may include a protection circuit as a program.

In response to the battery voltage exceeding a preset fully charged battery voltage, the protection circuit forcibly stops the flow of a charging current. In response to a battery voltage during discharge being less than a preset dischargeable voltage, the protection circuit forcibly stops discharging the current. Such sudden power shutdown due to the operation of the protection circuit can greatly affect facilities (power receivers) receiving power from the electrochemical cell module. To avoid such a situation, in response to the battery voltage decreasing to the dischargeable voltage, a user may receive warning information such as a message stating "Low battery. Charge now." on a display, with a sound, or in any other manner. In response to the warning signal, the user stores data into, for example, a memory and then stops the facility.

The protection circuit implements a charging sequence including, for example, constant-current charging, constant-voltage charging, and determining that the battery is fully charged in this order. Charging with a constant current (constant-current charging) is performed, and constant-voltage constant-current (CVCC) control shifts the constant current to the constant voltage. In response to the battery voltage increasing substantially to a fully charged voltage, the protection circuit performs charging at a constant voltage. During the constant-voltage charging, the charging current naturally decreases as the internal voltage of the battery increases. In response to the current value decreasing to a constant current value, the protection circuit determines that the charging is complete and thus stops charging.

The present disclosure may be implemented in the following forms.

An electrochemical cell according to one or more embodiments of the present disclosure includes an electricity generator that charges and discharges through an electrochemical reaction, an inner case accommodating the electricity generator, and an outer case including a first sheet and a second sheet. The outer case accommodates the inner case between the first sheet and the second sheet. The first sheet and the second sheet are bonded to each other at peripheries of the first sheet and the second sheet. The inner case is bonded to the outer case.

An electrochemical cell module according to one or more embodiments of the present disclosure includes a plurality of the above electrochemical cells, a current collector electrically connecting the plurality of electrochemical cells to one another, and a housing accommodating the plurality of electrochemical cells.

The electrochemical cell and the electrochemical cell module according to one or more embodiments of the present disclosure include the inner case and the outer case bonded together. This structure eliminates misalignment in the outer case under vibration or another force in the electrochemical cell and the electrochemical cell module including the electrochemical cells. With the inner case and the outer case joined together by bonding, the electrochemical cell and the electrochemical cell module including the electrochemical cells have higher design flexibility in manufacture, such as in the size of the electrochemical cell, the position or length of the joint, or the number of joints.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

The invention claimed is:

1. An electrochemical cell, comprising:
- a plurality of electricity generators stacked in a first direction, each of the plurality of electricity generators configured to charge and discharge through an electrochemical reaction;
- a plurality of inner cases accommodating the plurality of electricity generators, respectively,
  - each of the plurality of inner cases including a first portion extending outside from an area surrounding a corresponding electricity generator and along a second direction perpendicular to the first direction; and
- an outer case including a first sheet and a second sheet,
  - the outer case accommodating the plurality of inner cases between the first sheet and the second sheet,
  - the first sheet and the second sheet being bonded to each other at peripheries of the first sheet and the second sheet, and
  - the outer case including a second portion surrounding the first portion of said each of the plurality of inner cases, wherein
- each of the first sheet and the second sheet has
  - a first section extending in the second direction,
  - a second section continuously extending from the first section in the first direction, and
  - a third section continuously extending from the second section in the second direction, the third section of the first sheet and the third section of the second sheet are directly bonded together, without any part of any of the plurality of inner cases interposed therebetween, the first portion of a first inner case of the plurality of inner cases extends in the second direction and is bonded to the first section of the first sheet, the first portion of a second inner case of the plurality of inner cases extends in the second direction and is bonded to the first portion of the first inner case, the first portion of the first inner case is sandwiched in the first direction between the first section of the first sheet and the first portion of the second inner case, and an end of the first portion of said each of the plurality of inner cases along the second direction is bonded to the corresponding second section.

2. The electrochemical cell according to claim 1, wherein each of the outer case and the plurality of inner cases includes a stack including a thermally adhesive resin layer as an innermost layer, and the plurality of electricity generators, the plurality of inner cases, and the outer case are rectangular plates.

3. The electrochemical cell according to claim 2, wherein the thermally adhesive resin layer in said each of the plurality of inner cases is bonded to the thermally adhesive resin layer in the outer case.

4. The electrochemical cell according to claim 1, wherein a bonding portion bonding the outer case and the plurality of inner cases has a lower bonding strength than a bonding portion bonding the first sheet and the second sheet in the outer case.

5. The electrochemical cell according to claim 1, wherein each of the plurality of electricity generators includes a positive electrode including a positive electrode active material and a positive electrode current collector, a negative electrode including a negative electrode active material and a negative electrode current collector, a partition wall between the positive electrode and the negative electrode, a terminal connected to the positive electrode, and a terminal connected to the negative electrode, and the terminals of the plurality of electricity generators are held by the plurality of inner cases and the outer case with distal ends of the terminals protruding outward.

6. The electrochemical cell according to claim 1, wherein said each of the plurality of inner cases includes a base layer, and an adhesive layer between the base layer and the corresponding electricity generator, and the adhesive layer exposed at the end of the first portion of said each of the plurality of inner cases is directly bonded to the corresponding second section.

7. The electrochemical cell according to claim 6, wherein the base layers at the first portions of adjacent inner cases of the plurality of inner cases directly contact each other.

8. The electrochemical cell according to claim 7, wherein a bonding portion bonding the adhesive layer exposed at the end of the first portion of said each of the plurality of inner cases and the corresponding second section has a lower bonding strength than the bonding portion bonding the third section of the first sheet and the third section of the second sheet in the outer case.

9. The electrochemical cell according to claim 8, wherein each of the first sheet and the second sheet of the outer case includes an outer coating layer, an inner coating layer, and a base layer between the outer coating layer and the inner coating layer, the inner coating layers of the first sheet and the second sheet are directly bonded to each other at the further bonding portion, and the adhesive layer exposed at the end of the first portion of said each of the plurality of inner cases is directly bonded to the inner coating layers of the first sheet and the second sheet at the corresponding second sections.

10. An electrochemical cell module, comprising:

a plurality of electrochemical cells;

a current collector electrically connecting the plurality of electrochemical cells to one another; and a housing accommodating the plurality of electrochemical cells, wherein each of the plurality of electrochemical cells includes:

a plurality of electricity generators stacked in a first direction, each of the plurality of electricity generators configured to charge and discharge through an electrochemical reaction, a plurality of inner cases accommodating the plurality of electricity generators, respectively, each of the plurality of inner cases including a first portion extending outside from an area surrounding a corresponding electricity generator and along a second direction perpendicular to the first direction, and an outer case including a first sheet and a second sheet, the outer case accommodating the plurality of inner cases between the first sheet and the second sheet, the first sheet and the second sheet being bonded to each other at peripheries of the first sheet and the second sheet, and the outer case including a second portion surrounding the first portion of said each of the plurality of inner cases, each of the first sheet and the second sheet has a first section extending in the second direction, a second section continuously extending from the first section in the first direction, and a third section continuously extending from the second section in the second direction, the third section of the first sheet and the third section of the second sheet are directly bonded together, without any part of any of the plurality of inner cases interposed therebetween, the first portion of a first inner case of the plurality of inner cases extends in the second direction and is bonded to the first section of the first sheet, the first portion of a second inner case of the plurality of inner cases extends in the second direction and is bonded to the first portion of the first inner case, the first portion of the first inner case is sandwiched in the first direction between the first section of the first sheet and the first portion of the second inner case, and an end of the first portion of said each of the plurality of inner cases along the second direction is bonded to the corresponding second section.

11. The electrochemical cell module according to claim 10, wherein said each of the plurality of inner cases includes a base layer, and an adhesive layer between the base layer and the corresponding electricity generator, and the adhesive layer exposed at the end of the first portion of said each of the plurality of inner cases is directly bonded to the corresponding second section.

12. The electrochemical cell module according to claim 11, wherein the base layers at the first portions of adjacent inner cases of the plurality of inner cases directly contact each other.

13. The electrochemical cell module according to claim 12, wherein a bonding portion bonding the adhesive layer exposed at the end of the first portion of said each of the plurality of inner cases and the corresponding second section has a lower bonding strength than the bonding portion bonding the third section of the first sheet and the third section of the second sheet in the outer case.

14. The electrochemical cell module according to claim 13, wherein each of the first sheet and the second sheet of the outer case includes an outer coating layer, an inner coating layer, and a base layer between the outer coating layer and the inner coating layer, the inner coating layers of the first sheet and the second sheet are directly bonded to each other at the further bonding portion, and the adhesive layer exposed at the end of the first portion of said each of the plurality of inner cases is directly bonded to the inner coating layers of the first sheet and the second sheet at the corresponding second sections.

15. An electrochemical cell system, comprising:

at least one electrochemical cell module; and a controller configured to control the at least one electrochemical cell module, wherein the at least one electrochemical cell module includes a plurality of electrochemical cells, a current collector electrically connecting the plurality of electrochemical cells to one another, and a housing accommodating the plurality of electrochemical cells, each of the plurality of electrochemical cells includes:

a plurality of electricity generators stacked in a first direction, each of the plurality of electricity generators configured to charge and discharge through an electrochemical reaction, a plurality of inner cases accommodating the plurality of electricity generators, respectively, each of the plurality of inner cases including a first portion extending outside from an area surrounding a corresponding electricity generator and along a second direction perpendicular to the first direction, and an outer case including a first sheet and a second sheet, the outer case accommodating the plurality of inner cases between the first sheet and the second sheet, the first sheet and the second sheet being bonded to each other at peripheries of the first sheet and the second sheet, and the outer case including a second portion surrounding the first portion of said each of the plurality of inner cases, each of the first sheet and the second sheet has a first section extending in the second direction, a second section continuously extending from the first section in the first direction, and a third section continuously extending from the second section in the second direction, the third section of the first sheet and the third section of the second sheet are directly bonded together, without any part of any of the plurality of inner cases interposed therebetween, the first portion of a first inner case of the plurality of inner cases extends in the second direction and is bonded to the first section of the first sheet, the first portion of a second inner case of the plurality of inner cases extends in the second direction and is bonded to the first portion of the first inner case, the first portion of the first inner case is sandwiched in the first direction between the first section of the first sheet and the first portion of the second inner case, and an end of the first portion of said each of the plurality of inner cases along the second direction is bonded to the corresponding second section.

16. The electrochemical cell system according to claim 15, wherein said each of the plurality of inner cases includes a base layer, and an adhesive layer between the base layer and the corresponding electricity generator, and the adhesive layer exposed at the end of the first portion of said each of the plurality of inner cases is directly bonded to the corresponding second section.

17. The electrochemical cell system according to claim 16, wherein the base layers at the first portions of adjacent inner cases of the plurality of inner cases directly contact each other.

18. The electrochemical cell system according to claim 17, wherein a bonding portion bonding the adhesive layer exposed at the end of the first portion of said each of the plurality of inner cases and the corresponding second section has a lower bonding strength than the bonding portion bonding the third section of the first sheet and the third section of the second sheet in the outer case.

19. The electrochemical cell system according to claim 18, wherein each of the first sheet and the second sheet of the outer case includes an outer coating layer, an inner coating layer, and a base layer between the outer coating layer and the inner coating layer, the inner coating layers of the first sheet and the second sheet are directly bonded to each other at the further bonding portion, and the adhesive layer exposed at the end of the first portion of said each of the plurality of inner cases is directly bonded to the inner coating layers of the first sheet and the second sheet at the corresponding second sections.

* * * * *